3,075,945
THERMOSETTING RESINS FORMED BY REACTING FORMALDEHYDE WITH RESINS PRODUCED FROM BENZOGUANAMINE AND DIEPOXY MATERIALS
William J. Kissel, New York, N.Y., assignor to Interchemical Corporation, New York, N.Y.
No Drawing. Filed Sept. 30, 1959, Ser. No. 843,349
2 Claims. (Cl. 260—45.2)

This invention relates to new organic solvent soluble thermosetting resins in which the triazine nucleus has been incorporated with a diepoxide resin by the copolymerization of a triazine with a diepoxide.

It is well known that triazines such as ammeline, melamine, substituted melamines and benzoguanamine may be reacted with aldehyde to provide very hard thermosetting resins that are stain and scratch resistant, display good alkali and detergent resistance, display a high gloss and good gloss retention as well as good color retention. The above described desirable properties are essentially due to the presence of the triazine molecule.

While these triazine-aldehyde resins have proven very valuable in a number of applications, when used alone, they are not satisfactory for most surface coating applications due to their poor adhesion to many metal surfaces and to their very slight flexibility.

There has now been discovered a novel class of resins in which the triazine molecule is incorporated with a relatively flexible polymer to provide a novel thermosetting resin which retains all of the desirable properties resulting from the presence of the triazine molecule and, in addition, is flexible and has good adhesion to metal surfaces.

The novel organic solvent soluble thermosetting resins of this invention are copolymers incorporating triazine molecules separated by relatively flexible diepoxy monomers. These novel resins are prepared by the reaction of a 1,3,5-triazine with a diepoxide material in a reflux organic solvent.

In preparing my novel graft copolymers I prefer to use the "Epon" ethoxyline resins, "Epon 828." The term Epon is a registered trademark used to designate a class of ethoxyline resins formed by the reaction of Bisphenol A and epichlorohydrin. By referring to "Epon 828" resins in the specification I do not intend to limit the practice of my invention to only these resins. I merely wish to refer to these Epon resins as a convenient commercial source of the ethoxyline resins required in the practice of my invention. It will be obvious to those skilled in the art upon reading the following description and structural formulas of the required ethoxyline resins that there exist other commercial resins having the preferred structure and properties. Ethoxyline resins having my desired properties include other commercial resins found in the "ERL," the "Araldite," the "DER," the "Epi-Rez" and the "Epotuf" series as well as higher members of the Epon series such as Epon 1001, 1004, 1007 and 1009.

The ethoxyline resins used in this invention are conventionally prepared by reacting a polyhydric phenol, particularly Bisphenol A with epichlorohydrin. By regulating the proportions of these two reactants, the molecular size and the molecular structure of the ethoxyline resins produced may be controlled. By using an excess of epichlorohydrin, a low molecular weight ethoxyline resin is produced which has substantially the following structure:

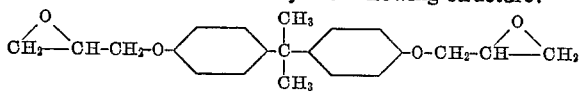

An ethoxyline resin having the above structure sold under the trademark "Epon 828" is the preferred resin in the practice of this invention. Epon 828 has an average molecular weight of 350, an epoxide equivalent weight of 175–210 and an average of almost 2 epoxides per molecule.

While the preferred triazine in the practice of this invention is benzoguanamine, it will be obvious that other triazines including ammeline, melamine and substituted melamine may be readily used in its place.

The reaction between the triazine and the diepoxide is conducted in solution. When the resin is to be used in solution, as in the formulation of surface coating compositions, it is preferable to prepare it in the solvent in which it is to be used. The amount of solution present is not ordinarily critical. While xylene is used in the illustrative examples, other volatile organic solvents such as benzene, ethyl benzene or toluene among others may be used.

The ratios of the two reactants are not critical. That is, while the properties will gradually vary with changes in proportions of the reactants, there are no limits to the amount of each which may be incorporated. However, for best results, 2 moles of Epon 828 for each mole of benzoguanamine is recommended.

The novel resin produced is easily soluble in most organic solvents. As will be described in the examples, the produced resin contains 83% of the original epoxide oxygens and 85% of the original amino hydrogens still unreacted. These furnish sites capable of further reaction. By virtue of these unreacted sites, the resin may be readily set by curing or various types of reactive groups may be "tacked on" at these sites to improve the properties of the resin.

The properties of hardness, resistance to stains, scratches, alkali and detergents as well as gloss and color retention of this resin may be further enhanced by alkylolation and etherification of the above mentioned unreacted sites. There is accordingly provided by this invention a composition resulting from the etherification and alkylolation of the novel thermosetting resins. This is accomplished by reacting the resin with formaldehyde and butanol. While formaldehyde is used, it will be obvious that other aldehydes may readily accomplish this alkylolation. Further, while butanol is used, it will be obvious that any aliphatic alcohols may be used in the etherification.

The novel thermosetting resins of this invention provide surface coating compositions when they are combined in volatile organic solvents. These compositions upon curing are stain, scratch, alkali and detergent resistant, hard, flexible, show good adhesion to metal surfaces as well as good gloss and color retention. The novel resins also display good pigment wetting powers which facilitate the dispersion of pigments in vehicles containing these polymers.

The following examples will illustrate the practice of this invention:

*Example 1*

A mixture of 160 g. of benzoguanamine, 680 g. of Epon 828 and 170 g. of xylene is heated to reflux at 165° C. The mixture is then maintained at reflux for 1½ hours, after which, it is rapidly cooled in an ice bath. The product is found to have a 5.17% epoxide oxygen content on a solids basis or .32 equivalent of oxygen per 100 g. of solids. As the original mixture is calculated to have a 6.47% epoxide oxygen content by weight on a solids basis, it follows that 83.1% of the original epoxide oxygens remain unreacted.

To a portion of the resulting resin solution, there is added 1% by weight of $H_3PO_4$ (based on resin solids) and the solution is then roller coated on black iron panels and on 0.25 pound grade of electrolytic tinplate panels to give a dry film weight of 3.5 to 4.0 milligrams per square inch. The panels are then cured by baking at 177° C. for 10 minutes. The resulting film is hard, flexible, well cured, displays good adhesion and a high gloss and shows excellent resistance to steam processing by withstanding 60 minutes contact with steam at 121° C. without showing any appreciable discontinuity of film or film blush.

*Example 2*

A mixture of 2400 g. of Epon 828, 564 g. of benzoguanamine and 600 g. of xylene is heated to reflux at 162° C. The mixture is then maintained at reflux for 1¼ hours, after which, it is cooled rapidly in an ice bath. The resulting resin is found to have a 5.53% epoxide oxygen content on a solids basis or .33 equivalent of oxygen per 100 g. of solids. As the original mixture is calculated to have a 6.66% epoxide oxygen content by weight on a solids basis, it follows that 82.5% of the original epoxide oxygens remain unreacted.

When coated on black iron and tin plate in accordance with the procedure described in Example 1, the cured film displays properties equivalent to those of the film of Example 1.

*Example 3*

300 g. of the product of Example 2, 58.4 g. of Butyl Formcel (40% formaldehyde, 52% butanol, and 8% water by weight), 55.2 g. of butanol and 112.2 g. of xylene are heated to 60° C. 2.8 g. of 85% $H_3PO_4$ are added to the mixture and it is heated to reflux at 110° C. The water formed during the reaction is then removed by azeotropic distillation between 100° C. and 128° C. for 3½ hours.

243 g. of the product is then diluted with a solvent comprising 20 g. of xylene, 10 g. butanol and 80 g. of isophorone and coated on black iron and tin plate at a calculated dry film weight of 3.5 mg./in.² and baked at 204° C. for 12 minutes. The resulting film is well cured, hard, flexible, displays good adhesion, and good resistance to steam processing by withstanding 60 minutes contact with steam at 121° C. without showing any appreciable discontinuity of film or blushing.

*Example 4*

1200 g. of the product of Example 2 are dissolved in 221 g. of butanol and 44 g. of xylene by heating. 11.2 g. of 85% $H_3PO_4$ and 234 g. of Butyl Formcel (40% formaldehyde, 52% butanol and 8% water) are added and the mixture is heated to reflux at 103° C. The water formed during the reaction is then removed by azeotropic distillation between 103° C. and 123° C. for 3½ hours. The product has a solids content of 52.63% by weight on a solids basis. When coated on black iron and tin plate in accordance with the procedure described in Example 3, the cured film displays properties equivalent to those of the film of Example 3.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An organic solvent soluble thermosetting resin comprising the condensation product of (*a*) a resin formed by the reaction of benzoguanamine and a diepoxy material having the formula

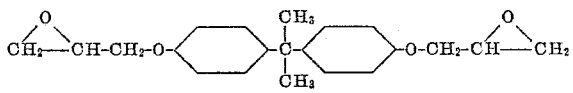

(*b*) butanol and (*c*) formaldehyde.

2. A surface coating composition comprising a volatile organic solvent solution of the resin of claim 1.

References Cited in the file of this patent

UNITED STATES PATENTS

| | | |
|---|---|---|
| 2,481,155 | Schaefer | Sept. 6, 1949 |
| 2,700,030 | Widmer et al. | Jan. 18, 1955 |
| 2,824,850 | Widmer et al. | Feb. 25, 1958 |
| 2,928,811 | Belanger | Mar. 15, 1960 |